United States Patent
Devine

Patent Number: 5,978,745
Date of Patent: Nov. 2, 1999

[54] SYSTEM AND METHOD FOR AUTOMATICALLY CALIBRATING DISPLAY MONITOR BEAM CURRENTS

[75] Inventor: Jesse Devine, Sunnyvale, Calif.

[73] Assignee: Apple Computer, Inc., Cupertino, Calif.

[21] Appl. No.: 09/012,920

[22] Filed: Jan. 23, 1998

[51] Int. Cl.$^6$ .................................................... H04N 9/71
[52] U.S. Cl. ............................ 702/107; 348/180; 348/181
[58] Field of Search .................... 702/107; 348/180–182, 348/326, 656, 658; 376/108

[56] References Cited

U.S. PATENT DOCUMENTS

| | | | |
|---|---|---|---|
| 4,264,823 | 4/1981 | Sloughter et al. | 376/108 |
| 5,258,828 | 11/1993 | Sano et al. | 348/658 |
| 5,361,093 | 11/1994 | Yamamoto et al. | 348/656 |
| 5,369,432 | 11/1994 | Kennedy | 348/181 |
| 5,512,961 | 4/1996 | Cappels, Sr. | 348/658 |
| 5,561,459 | 10/1996 | Stokes et al. | 348/180 |
| 5,821,917 | 10/1998 | Cappels | 348/173 |

*Primary Examiner*—John Barlow
*Assistant Examiner*—Bryan Bui
*Attorney, Agent, or Firm*—Carr & Ferrell LLP

[57] ABSTRACT

A system and method for automatically-calibrating display monitor beam currents. A device selects a target beam current within a display monitor. A current sampler measures a present beam current within the display monitor. A beam current controller increases a gain of an amplifier within the monitor by a delta value if the present beam current is less than the target beam current, and decreases the gain of the amplifier by the delta value if the present beam current is greater than the target beam current. A first step in the method selects a target beam current. A second step measures a present beam current generated by an amplifier. A third step increases a gain of the amplifier by a delta value if the present beam current is less than the target beam current. A fourth step decreases the gain of the amplifier by the delta value if the present beam current is greater than the target beam current. A fifth step sets a multiplier to a predetermined value. A sixth step multiplies the delta value by the multiplier. A seventh step reduces the multiplier by a predetermined amount if the present beam current crosses the target beam current.

23 Claims, 5 Drawing Sheets

SYSTEM AND METHOD FOR AUTOMATICALLY CALIBRATING DISPLAY MONITOR BEAM CURRENTS

CROSS-REFERENCE TO RELATED APPLICATIONS

This application relates to and incorporates by reference co-pending U.S. patent applications Ser. No. 08/036,349, entitled "Method and System of Achieving Accurate White Point Setting of a CRT Display," filed on Mar. 24, 1993, by inventor Richard D. Cappels, Sr. and Ser. No. 08/504,433, entitled "System and Method to Compensate for the Effects of Aging of the Phosphors and Faceplate Upon Color Accuracy in a Cathode Ray Tube," filed on Jul. 20, 1995, by inventor Richard D. Cappels, Sr. These related applications are commonly assigned to Apple Computer, Inc., a California Corporation.

BACKGROUND OF THE INVENTION

1. Field of the Invention

The present invention relates generally to systems and methods for display monitor control, and more particularly to a system and method for automatically calibrating display monitor beam currents.

2. Discussion of Background Art

Maintaining color accuracy in computer monitors is of increasing concern to many computer users as well computer designers and manufacturers. The proliferation of computers for use in applications where color accuracy is critical makes faithful color reproduction more than merely an aesthetically pleasing feature in a computer monitor. Fields where color accuracy may be critical may include, for example, medicine, computer graphics, and engineering design work.

Tristimulus values, as further explained in *Color Measurement, Theme and Variation*, D. L. MacAdam, 2nd ed., Springer-Verlag, pp. 9–21, represent the amount of light energy in overlapping bands referred to as X, Y, and Z. The X, Y, and Z bands correspond to the three channels of a model of human color vision known as the C.I.E. standard of 1976, in which average observers perceive specific hues according to the ratios of light energy in the three bands X, Y, and Z. The tristimulus X, Y, and Z value ratio corresponds to a particular hue. Further, the summed weighted energies of these three bands describe the intensity or luminance of the light. Thus, a given set of tristimulus values may be used to effectively represent a specific a hue at a specific luminance.

Various factors degrade the color of images displayed on computer monitors. A significant factor is cathode ray tube (CRT) aging. Over time, electron and ion bombardment changes the hue and luminous efficiency of the light emitted from the phosphors used in the face of a cathode ray tube. The mechanism of these changes is thought to be the generation of non-emitting recombination centers and/or the loss of activator centers due to changes in the state of ionization of activator constituents. Each of the three primary colors uses a respective phosphor with a different chemical composition (having a different rate of deterioration and aging) which also contributes to the total hue shift.

The rate of CRT color degradation depends primarily upon beam current, acceleration voltage, and CRT temperature. If the acceleration voltage and temperature are held constant, as is typical in CRT displays, then phosphor degradation is substantially a function of the accumulated number of Coulombs of beam current that have passed through the cathode onto the phosphors of the CRT.

Another significant contribution to color degradation is the aging of the CRT's glass faceplate. High-energy electron and X-ray bombardment alters the chemical structure of the faceplate glass and unevenly reduces its transmission of light, dramatically more at shorter wavelengths than at medium and longer wavelengths, thus shifting the transmission of hues toward yellow. The faceplate's rate of change for light transmission depends primarily upon the total amount beam current and acceleration voltage over time.

Color degradation is compensated for most commonly by adjusting the computer monitor's beam current. The beam current is adjusted indirectly by varying the gain of the computer monitor's video amplifiers. There is one video amplifier for each of the red, green, and blue electron guns within the monitor. Since the relationship between the gain of each video amplifier and the resultant beam current is non-linear, the beam current in most monitors is manually calibrated.

For manual calibration, the computer monitor is provided with individual manual color controls for adjusting the gain of its red, green, and blue video amplifiers as well as its overall luminance. A spectra-radiometer, or a photometer, is then used to objectively measure the monitor's tristimulus values using a white screen generated on the monitor's display. The spectra-radiometer measures and displays the tristimulus values of this image. Using these tristimulus values, the gain of the red, green, and blue video amplifiers are adjusted using the manual color controls. The color controls are adjusted until the tristimulus value readings on the spectra-radiometer match a corresponding set of tristimulus values of a desired chromaticity image.

Another manual calibration method involves comparing a test-pattern generated on the monitor with a series of colored cards. This system is relatively inaccurate since it relies on a subjective comparison between the test-pattern and the colored cards.

What is needed is a system and method for automatically calibrating display monitor beam currents that solves the foregoing problems of conventional manual calibration systems.

A system and method for automatic calibration should account for the fact that the relationship between the gain and current in a video display is unknown and changes over the life of the display. Such a system and method should also be relatively fast and relatively stable, even when faced with unstable or fluctuating beam current measurements.

SUMMARY OF THE INVENTION

The present invention provides a system and method for automatically calibrating display monitor beam currents. Within the system of the invention there is a means for selecting a target beam current within a display monitor. Once selected, a current sampler measures a present beam current within the display monitor. A beam current controller increases a gain of an amplifier within the monitor by a delta value if the present beam current is less than the target beam current, and decreases the gain of the amplifier by the delta value if the present beam current is greater than the target beam current. The beam current controller continues to adjust the amplifier until the present beam current is within a predetermined tolerance of the target beam current.

According to the method of the invention, first, a target beam current is selected. A present beam current generated by an amplifier is then measured. A gain of the amplifier is increased by a delta value if the present beam current is less than the target beam current. The gain of the amplifier is decreased by the delta value if the present beam current is greater than the target beam current. These two gain adjustment steps are repeated until the present beam current is within a predetermined tolerance of the target beam current.

In another aspect of the method of the invention, a multiplier is set to a predetermined value. The delta value is then multiplied by the multiplier. The multiplier is reduced by a predetermined amount if the present beam current crosses the target beam current, before multiplying the delta value by the multiplier a second time.

In another aspect of the method of the invention, the target beam current is reduced by a predetermined amount if the amplifier is to be set to a gain which is greater than or equal to a maximum predetermined gain.

In yet another aspect of the method of the invention, the method is ended if the present beam current has crossed the target beam current more than a predetermined number of times.

These and other aspects of the invention are recognizable by those skilled in the art upon completing a review of the detailed description, drawings, and claims set forth below.

DETAILED DESCRIPTION OF THE PREFERRED EMBODIMENT

Figure 1:
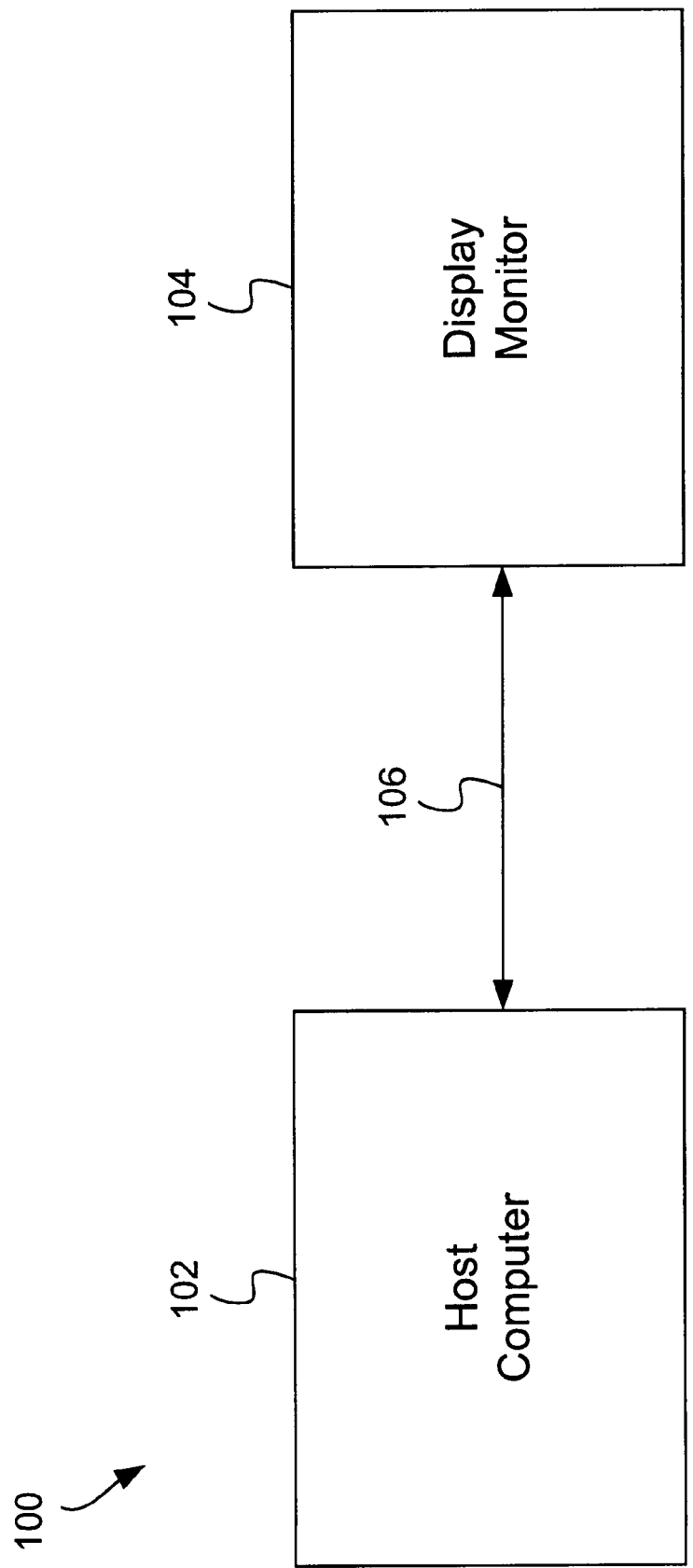
FIG. 1 is an exemplary block diagram of a system for automatically calibrating beam currents in a display monitor according to the present invention.

FIG. 1 is an exemplary block diagram of a system 100 for automatically calibrating beam currents in a display monitor 104 according to the present invention. The system 100 includes a host computer 102 and the display monitor 104 coupled together by bus 106. The host computer 102 is of a conventional type, such as a Macintosh computer, manufactured by Apple Computer Inc. of Cupertino, Calif., or a conventional PC type device. The display monitor 104 is preferably a color monitor and functions as a device for displaying images and text. Bus 106 carries commands and data between the computer 102 and the monitor 104. The computer 102 transmits images to the monitor 104 for display and adjusts the beam currents of the monitor 104 so that displayed images are chromatically correct.

Figure 2:
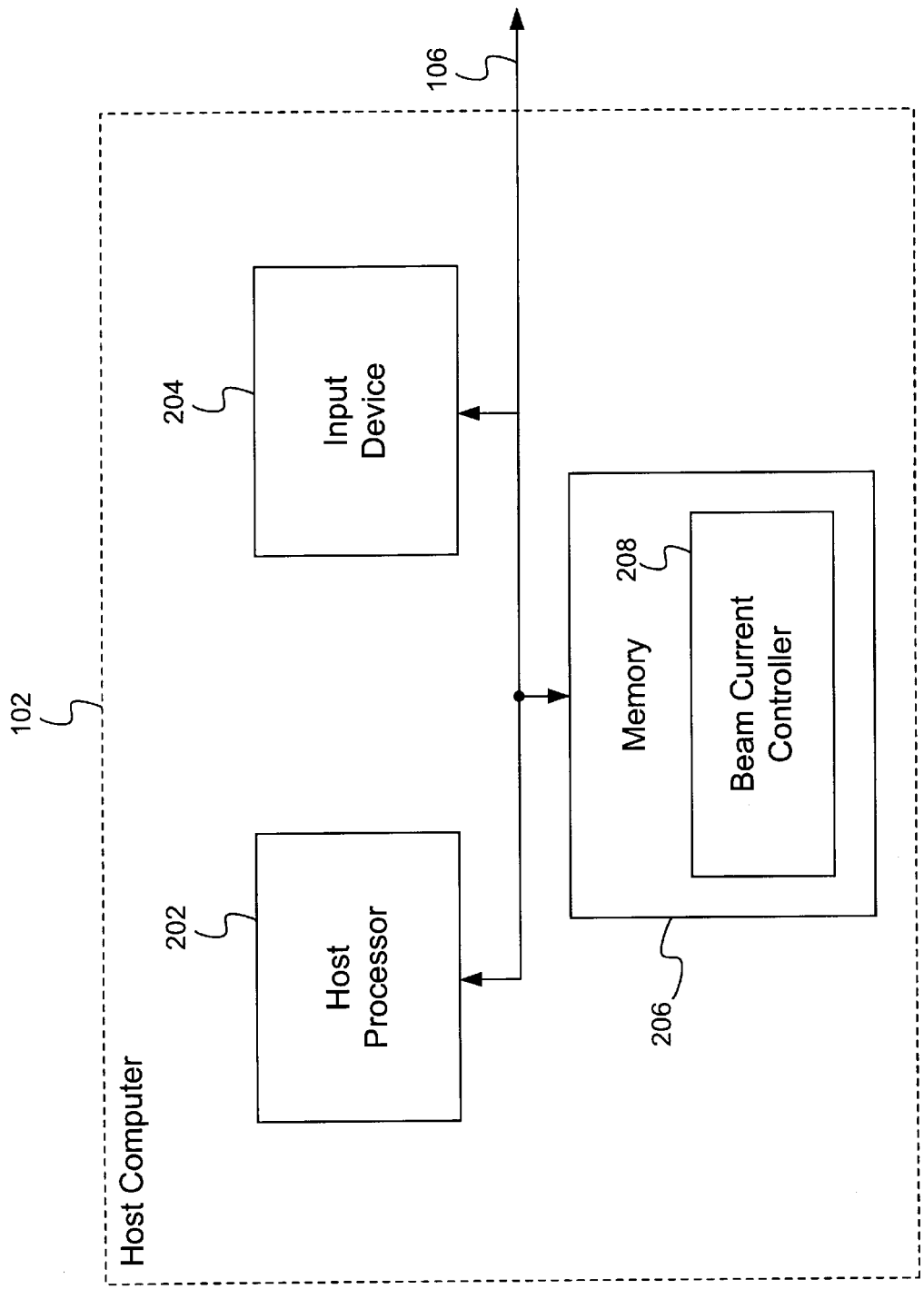
FIG. 2 is an exemplary block diagram of a host computer within the system of FIG. 1.

FIG. 2 is an exemplary block diagram of the host computer 102 within the system 100. The host computer 102 includes a host processor 202, an input device 204, and a memory 206, each coupled to bus 106. The host processor 202 executes program instructions stored in the memory 206. The input device 204 preferably includes a keyboard and mouse for enabling the host processor 202 to interpret commands and data entered by a user. The memory 206 stores computer program instructions for controlling how the host processor 202 accesses, transforms and outputs data, and preferably includes both a volatile and a non-volatile portion. Those skilled in the art will recognize that the memory 206 can be supplemented with other computer-useable storage media, including a compact disk, a magnetic drive or a dynamic random access memory. The memory 206 includes a Beam Current controller (BCC) 208 which is comprised of program instructions for calibrating the beam currents of the monitor 104.

The BCC 208 adjusts a white point of the display monitor 104 by calculating a target beam current (assuming a solid white video source) and then manipulating gain of amplifiers within the monitor 104 until a present beam current actually measured (again with a full white video source) matches the target beam current. The gain for each of the amplifiers within the monitor 104 is represented by an 8-bit numerical value; however, those skilled in the art will recognize that gain as well as any other parameter may be represented by any predetermined number of bits. The BCC 208 may use one of several different methods to adjust the white point of the monitor 104.

First, an increment/decrement method may be used. In this method, the gain of the monitor 104 is adjusted by single increments or decrements, depending on whether the present beam current was higher or lower than the target beam current. While this methodology is relatively stable, it is also relatively slow. This first method also does not address a possibility that an exact match of the present and target beam currents may not be possible due to limitations in any A-to-D converters in the monitor 104, and thus may go back and forth over the target beam current indefinitely.

Second, a successive approximation method may be used. In this method, a comparison between the present beam current and the target beam current is made. A most significant bit is then either added to or subtracted from the gain of the monitor 104, depending upon whether the present beam current is either below or above the target beam current respectively. Another comparison is then made and a next most significant bit (MSB) is then added to or subtracted from the gain, and so on, until a least significant bit (LSB) has been adjusted. At this point, the method is over and the desired and actual beam currents should be very close together. This method has an advantage of fast speed, excellent stability when faced with fluctuating beam currents, and reasonable accuracy. However, a drawback of this method is a gain swing as the bit adjusted proceeds from the MSB to the LSB. This gain swing can sometimes send the monitor 104 into "overcurrent" mode, which causes the monitor 104 to shut down because a capacity of a power supply within the monitor 104 has been exceeded.

Third, a curve prediction method may be used. This method dynamically models a relationship between the gain and the beam current each time the beam current is adjusted. The method first sets the gain to a nominal value and measures the present beam current. Next, the gain is incremented by a predetermined amount and the present beam current is again measured. These four values (gain1, gain2, current1, and current2) are then fed into a formula that extracts an exponent from these two points (assuming that zero gain equals zero current). A new gain is then calculated and set. The present beam current is again measured and compared to the target beam current. If the present beam current is not within a predetermined tolerance of desired target beam current, the newly-calculated gain and its associated present beam current value is used with one of a previous gain/beam current pair to "home-in" on a more accurate exponent. Using the more accurate exponent yet another gain is calculated, set, and the present beam current is measured. This process continues until measured present beam current matches target beam current or a maximum number of iterations have been performed. This method, while very fast, has the drawback of being highly susceptible to fluctuations in measured current values. When the method is very close to setting the present beam current equal to the target beam current, the difference in gain between one gain/current pair and another is very small. Thus, minor fluctuations (even as small as a single increment or decrement) at this point may produce unreasonable exponents or even negative exponents, which may cause the method to go "open loop" and set a display on the monitor 104 to various bright colors or, in some cases, black.

While each of the three methods described may be used, a fourth method is preferred. The fourth method starts by placing gain and beam current in a linear relationship. A actual difference between target beam current and present beam current is calculated. Either the actual difference, a minimum difference, or a maximum difference is then added to or subtracted from the present gain setting. The method is then repeated. This method, "homes in" on a correct gain without causing the present beam current to grossly overshoot the target beam current, and thus avoids sending the monitor 104 into a shutdown condition. Further, each time the present beam current crosses from one side of the target beam current to the other, a multiplier (which preferably had an initial value of 100%) is preferably reduced by 25%. This multiplier is used before the gain is either added to or subtracted from. Thus, every time a crossing occurs the magnitude of the differences are reduced and whatever overshoot (or undershoot) may be present is reduced. This method terminates when the present beam current and the target beam currents are equal, or when a predetermined number of crossings have occurred. The fourth method is reasonably fast, fairly stable even when faced with fluctuating beam currents, highly accurate, and has a low risk of creating "overcurrent" conditions that might shut down the power supply of the monitor 104. Also, if the target current is not actually achievable, probably due to long-term degradation of the CRT cathodes, the method sets a new lower target current. At the end of each iteration of this method, the present gain is compared to a maximum acceptable gain. If the present gain is above the maximum acceptable gain, the target beam current is preferably reduced by 5% and the algorithm is restarted. The fourth method is further discussed in conjunction with a flowchart in FIG. 5.

Figure 3:
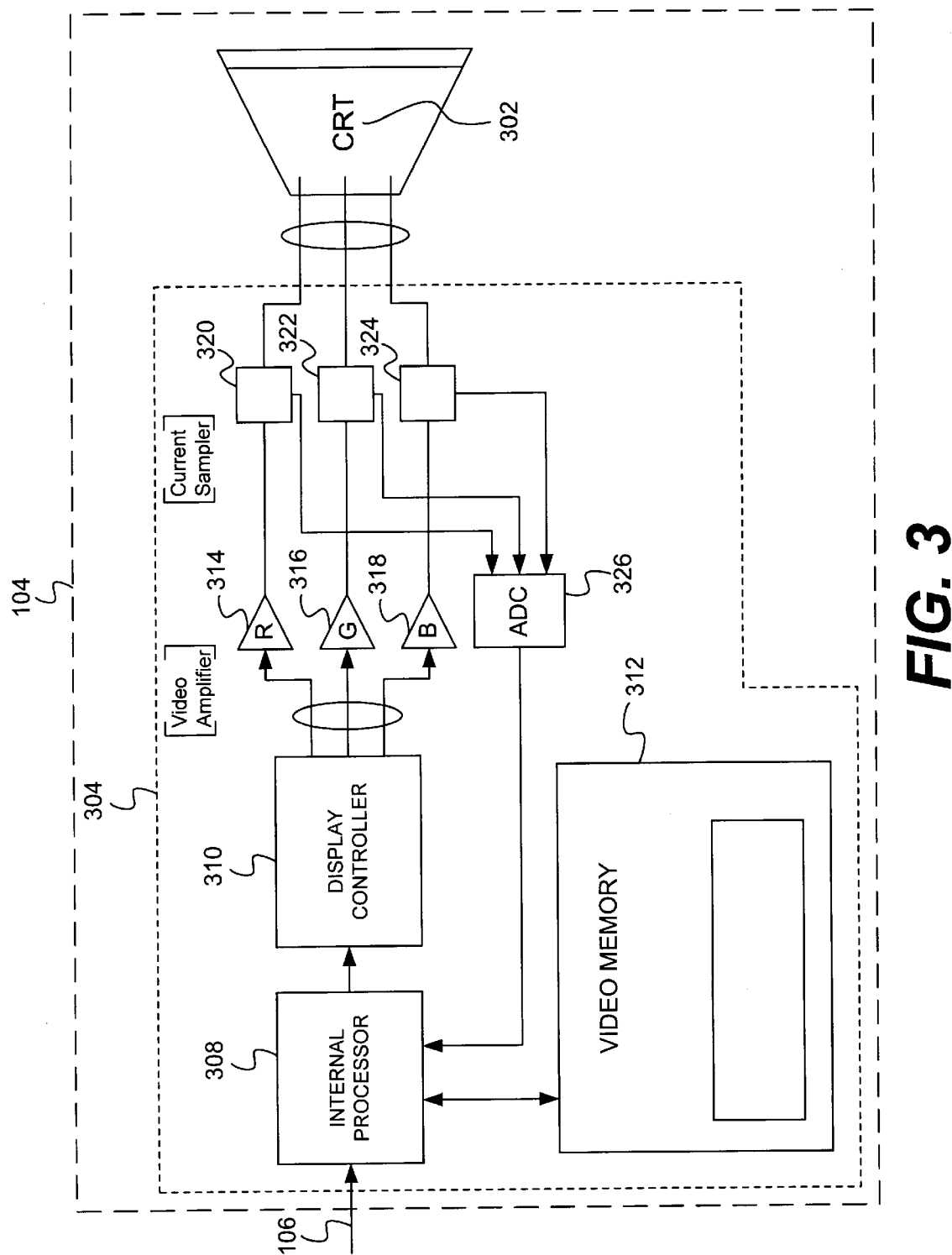
FIG. 3 is an exemplary block diagram of the display monitor within the system of FIG. 1.

FIG. 3 is an exemplary block diagram of the display monitor 104 within the system 100. The invention provides a video board (not shown) and a Cathode Ray Tube (CRT) 302. The video board generates beam currents for driving the CRT 302 in response to commands received from the host computer 102. The CRT 302 is preferably a conventional color cathode ray tube with red, green, and blue phosphors deposited on the interior surface of the tube's face, which glow when excited by the beam currents. A glass faceplate resides on an exterior face of the CRT 302. The CRT 302 preferably includes separate red, green, and blue cathodes, which control the beam currents so that a color picture may be displayed. A video monitor cabinet (not shown) almost fully encloses the CRT 302 and the video board, exposing only the exterior faceplate so that displayed images may be viewed.

The video board includes measuring circuit 304. Measuring circuit 304 monitors and controls the beam currents. Red channel video amplifier 314, green channel video amplifier 316, and blue channel video amplifier 318 each generate a beam current. The red video amplifier 314 receives a red analog voltage signal from a display controller 310 and in response provides a red channel beam current. The green video amplifier 316 receives a green analog voltage signal from the display controller 310 and in response provides a green channel beam current. The blue video amplifier 318 receives a blue analog voltage signal from the display controller 310 and in response provides a blue channel beam current. These beam currents are then sent to the CRT 302. Each amplifier 314, 316, and 318 preferably has a high input impedance and a low output impedance sufficient to drive the red, green and blue cathodes within the CRT 302.

Each beam current is monitored by either a red channel current sampler 320, a green channel current sampler 322, or a blue channel current sampler 324. The current samplers 320, 322, and 324 are coupled to respectively receive the red, green and blue beam currents from the amplifiers 314, 316, and 318. The current samplers 320, 322, and 324 sense a magnitude of each of the beam currents and in response provide a corresponding analog beam current measurement over paths to an Analog to Digital Converter (ADC) 326. Current samplers are well known in the art and may include current mirrors or networks of passive electronic components. The individual analog beam current samples are converted by the ADC 326 into digital beam current measurements. These digital beam current measurements are then fed back to an internal processor 308. A conventional timer (not shown) is included within the measuring circuit 304. The timer generates and sends a periodic timer signal to the internal processor 308.

The internal processor 308 receives the digital beam current measurements and the timer signal. Each time the timer signal is received, the internal processor 308 then sends a request to the host computer 102 for initiating a new red, green, and blue beam measurement and calibration routine. The host processor 202 and the internal processor 308 work in conjunction with the beam current controller 208 and a video memory 312 to send control signals to a display controller 310 which adjust the beam currents.

The display controller 310 receives and converts the digital signals from the internal processor 308 into the red, green and blue analog voltage signals. The display controller 310 includes a digital-to-analog converter and several buffers for maintaining the voltage signals at a level specified by the internal processor 308.

Figure 4:
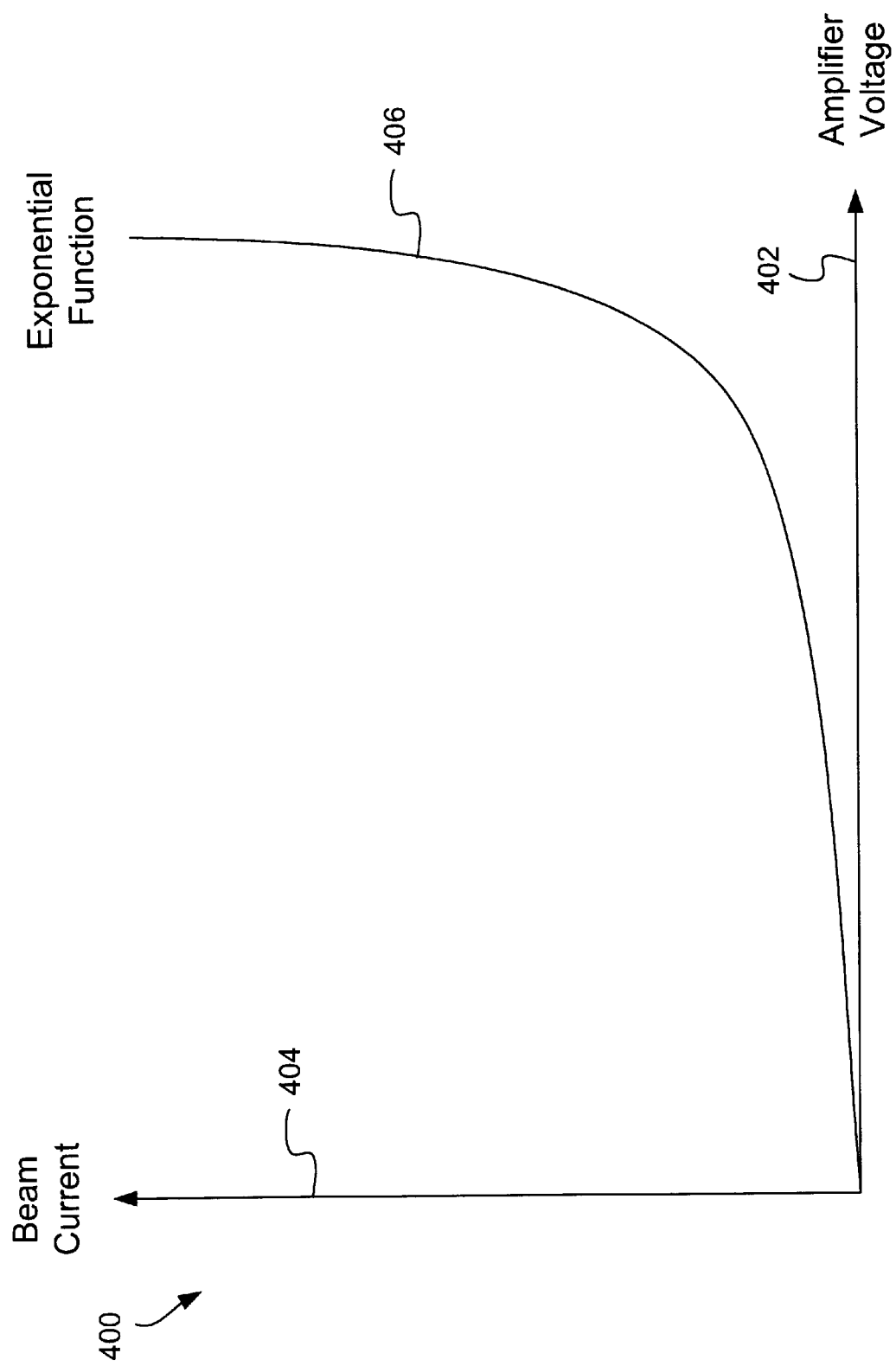
FIG. 4 is an exemplary graph of a relationship between amplifier voltage and beam current in the display monitor.

FIG. 4 is an exemplary graph 400 of a relationship between amplifier voltage 402 and beam current 404 in the display monitor 104. The graph 400 shows a typical voltage-current curve 406. Those skilled in the art will recognize that various other voltage-current curves may also exist, however, all of such curves would share a common nonlinear relationship. The curve 406 does not lend itself toward being defined by an equation, especially since the curve 406 changes over a lifetime of the display 104.

Figure 5:
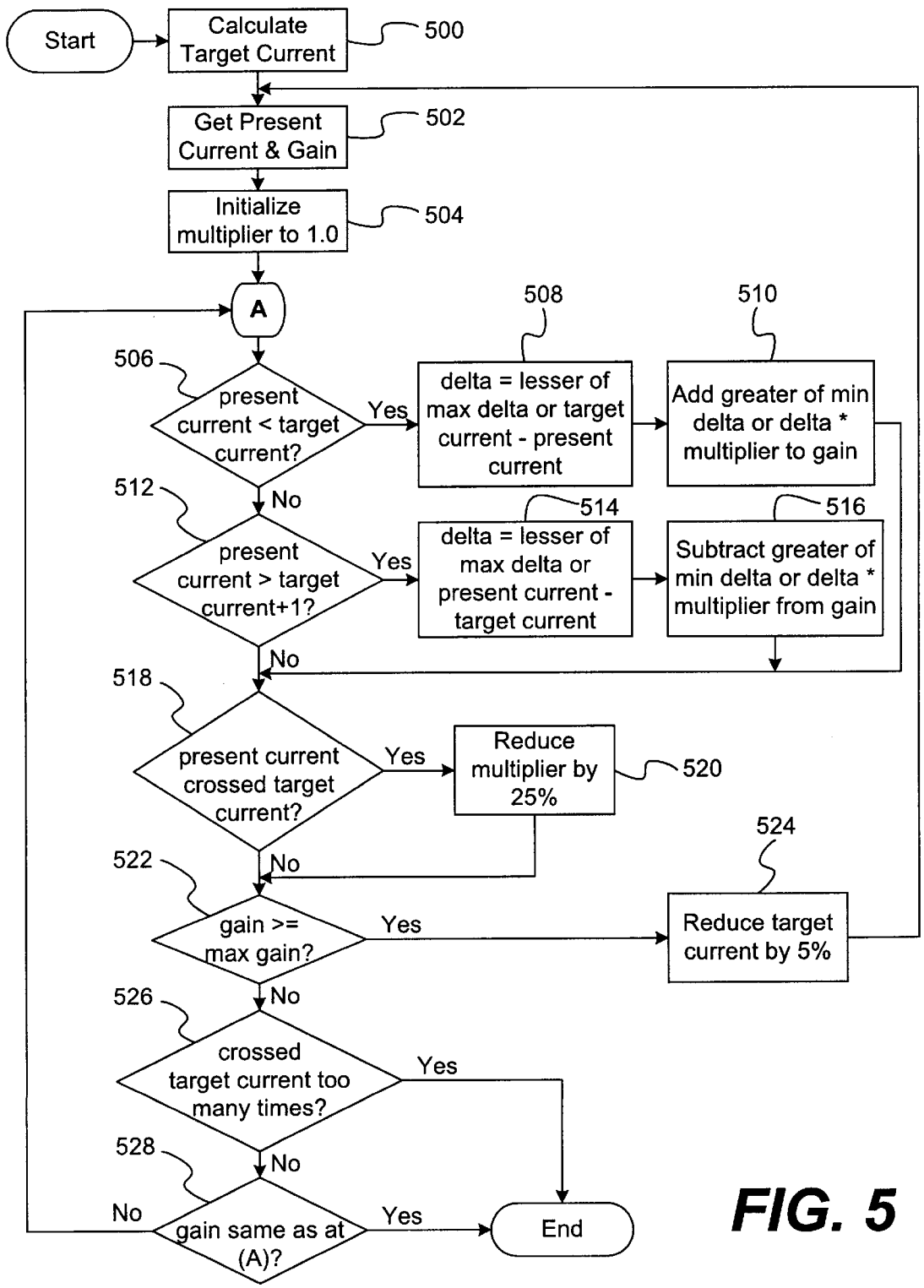
FIG. 5 is an exemplary flowchart of a preferred method for calibrating beam currents in a display monitor.

FIG. 5 is an exemplary flowchart of a preferred method for calibrating the beam currents in the display monitor 104. Those skilled in the art will recognize that while calibration of only the red beam current is described below, the method applies to the green and blue beam current calibrations as well. The method begins in step 500 where the Beam Current Controller (BCC) 208 calculates a target current according to a method described in co-pending U.S. patent application Ser. No. 08/504,433, which is incorporated by reference. Next, in step 502, the BCC 208 obtains a present current from the current sampler 320 and a present gain from the display controller 310. The BCC 208 then initializes multiplier to 100%, in step 504.

If in step 506, the present current is less than the target current, the method proceeds to step 508, else the method continues with step 512. In step 508, delta is equated by the BCC 208 to a lesser of either a maximum predetermined delta or the target current minus the present current. Next, in step 510, the BCC 208 adds a greater of either a minimum predetermined delta or the delta (calculated in step 508) multiplied by the multiplier to the present gain. The minimum predetermined delta is preferably equal to a least significant bit of the present gain. The BCC 208 then commands the display controller 310 to set a gain of the video amplifier 314 to the present gain.

If in step 512, the present current is greater than the target current plus one the method proceeds to step 514, else the method continues with step 518. In step 512 "one" is preferably equal to a least significant bit of the target current. In step 514, delta is equated by the BCC 208 to a lesser of either the maximum predetermined delta or the present current minus the target current. Next, in step 516, the BCC 208 subtracts a greater of either the minimum predetermined delta or the delta (calculated in step 508) multiplied by the multiplier from the present gain. The BCC 208 then commands the display controller 310 to set the gain of the video amplifier 314 to the present gain.

If in step 518, the present current value has crossed the target current value the method proceeds to step 520, else the method continues with step 522. "Crossed" refers to when, before step 506, the present current was either less or greater than the target current, but now at step 518 the present current is respectively greater or less than the target current. In step 520, the multiplier is reduced by a predetermined amount, such as 25%.

Next in step 522, if the gain of the video amplifier 314 is greater than or equal to the maximum gain, the method proceeds to step 524, else the method continues with step 526. In step 524, the target current is reduced by a predetermined amount, such as 5% and the method returns to step 502. Next, in step 526, if the present current has crossed the target current more than a predetermined number of times, the method ends, else the method continues with step 528. In step 528, if the gain of the video amplifier 314 is equal to the gain of the video amplifier 314 as it was before step 506, the method ends, else the method returns to step 506. After step 528 the preferred method ends.

While the present invention has been described with reference to a preferred embodiment, those skilled in the art recognize that various modifications are possible. Variations upon and modifications to the preferred embodiment are provided by the present invention, which is limited only by the following claims.

What is claimed is:

1. A method for automatically calibrating display monitor beam currents, comprising the steps of:
    selecting a target beam current;
    measuring a present beam current generated by an amplifier;
    increasing a gain of the amplifier by a first delta value if the present beam current is less than the target beam current;
    decreasing the gain of the amplifier by a second delta value if the present beam current is greater than the target beam current; and
    repeating the measuring, increasing and decreasing steps until the earlier of the present beam current has approached within a predetermined tolerance of the target beam current or the present beam current has crossed the target beam current a predetermined number of times.

2. The method of claim 1 wherein the increasing step includes the steps of:
    setting the first delta value equal to a lesser of a maximum predetermined delta or the target beam current minus the present beam current; and
    adding to the gain a greater of a minimum predetermined delta or the first delta value times a multiplier.

3. The method of claim 1 wherein the decreasing step includes the steps of:
    setting the second delta value equal to a lesser of a maximum predetermined delta or the present beam current minus the target beam current; and
    subtracting from the gain a greater of a minimum predetermined delta or the second delta value times a multiplier.

4. The method of claim 1 further including the steps of:
    setting a multiplier to a predetermined value;
    multiplying the delta values by the multiplier;
    reducing the multiplier by a predetermined amount if the present beam current crosses the target beam current; and
    repeating the setting and multiplying steps.

5. The method of claim 4 wherein the setting step includes the step of setting the multiplier to 100%.

6. The method of claim 4 wherein the reducing step includes the step of reducing the multiplier by 25%.

7. The method of claim 1 further including the step of reducing the target beam current by a predetermined amount if the amplifier is to be set to a gain which is greater than or equal to a maximum predetermined gain.

8. The method of claim 7 wherein the reducing step includes the step of reducing the target beam current by 5%.

9. The method of claim 1 further including the step of repeating the method steps until the present beam current is equal to the target beam current.

10. A system for automatically calibrating display monitor beam currents, comprising:
    means for selecting a target beam current;
    means for measuring a present beam current generated by an amplifier;
    means for increasing a gain of the amplifier by a first delta value if the present beam current is less than the target beam current;
    means for decreasing the gain of the amplifier by a second delta value if the present beam current is greater than the target beam current; and
    means for repeating the means for measuring, increasing and decreasing until the earlier of the present beam current has approached within a predetermined tolerance of the target beam current or the present beam current has crossed the target beam current a predetermined number of times.

11. The system of claim 10 wherein the means for increasing includes:
    means for setting the first delta value equal to a lesser of a maximum predetermined delta or the target beam current minus the present beam current; and
    means for adding to the gain a greater of a minimum predetermined delta or the first delta value times a multiplier.

12. The system of claim 10 wherein the means for decreasing includes:
    means for setting the second delta value equal to a lesser of a maximum predetermined delta or the present beam current minus the target beam current; and means for subtracting from the gain a greater of a minimum predetermined delta or the second delta value times a multiplier.

13. The system of claim 10 further including:

means for setting a multiplier to a predetermined value;

means for multiplying the delta values by the multiplier;

means for reducing the multiplier by a predetermined amount if the present beam current crosses the target beam current; and means for repeating the means for setting and multiplying.

14. The system of claim 10 further including means for reducing the target beam current by a predetermined amount if the amplifier is to be set to a gain which is greater than or equal to a maximum predetermined gain.

15. A computer-useable medium embodying computer program code for causing a computer to automatically calibrate display monitor beam currents by performing the steps of:

selecting a target beam current;

measuring a present beam current generated by an amplifier;

increasing a gain of the amplifier by a first delta value if the present beam current is less than the target beam current;

decreasing the gain of the amplifier by a second delta value if the present beam current is greater than the target beam current; and repeating the measuring, increasing and decreasing steps until the earlier of the present beam current has approached within a predetermined tolerance of the target beam current or the present beam current has crossed the target beam current a predetermined number of times.

16. The computer-useable medium of claim 15 wherein the increasing step further performs the steps of:

setting the first delta value equal to a lesser of a maximum predetermined delta or the target beam current minus the present beam current; and adding to the gain a greater of a minimum predetermined delta or the first delta value times a multiplier.

17. The computer-useable medium of claim 15 wherein the decreasing step further performs the steps of:

setting the second delta value equal to a lesser of a maximum predetermined delta or the present beam current minus the target beam current; and subtracting from the gain a greater of a minimum predetermined delta or the second delta value times a multiplier.

18. The computer-useable medium of claim 15 further performing the steps of:

setting a multiplier to a predetermined value;

multiplying the delta values by the multiplier;

reducing the multiplier by a predetermined amount if the present beam current crosses the target beam current; and repeating the setting and multiplying steps.

19. The computer-useable medium of claim 15 further performing the step of reducing the target beam current by a predetermined amount if the amplifier is to be set to a gain which is greater than or equal to a maximum predetermined gain.

20. A method for automatically calibrating display monitor beam currents, comprising the steps of:

a) selecting a target beam current;

b) setting a multiplier to an initial value of 1.0;

c) measuring a present beam current generated by an amplifier having a gain;

d) if the present beam current is less than the target beam current then setting a delta value to a lesser of a maximum predetermined delta or the target beam current minus the present beam current, and increasing the gain of the amplifier a greater of a minimum of a predetermined delta or a product of the delta value multiplied by said multiplier;

e) if the present beam current is greater than the target beam current then setting the delta value to a lesser of a maximum predetermined delta or the present beam current minus the target beam current, and decreasing the gain of the amplifier a greater of a minimum of a predetermined delta or a product of the delta value multiplied by said multiplier;

f) if the present beam current crosses the target beam current then reducing the multiplier by a predetermined amount; and g) repeating steps c through f until the present beam current is within a predetermined tolerance of the target beam current.

21. The method of claim 20 wherein step f includes the step of reducing the multiplier by 25%.

22. The method of claim 20 further including the step of reducing the target beam current by a predetermined amount if the amplifier is to be set to a gain which is greater than or equal to a maximum predetermined gain.

23. The method of claim 22 wherein the reducing step includes the step of reducing the target beam current by 5%.

* * * * *